UNITED STATES PATENT OFFICE.

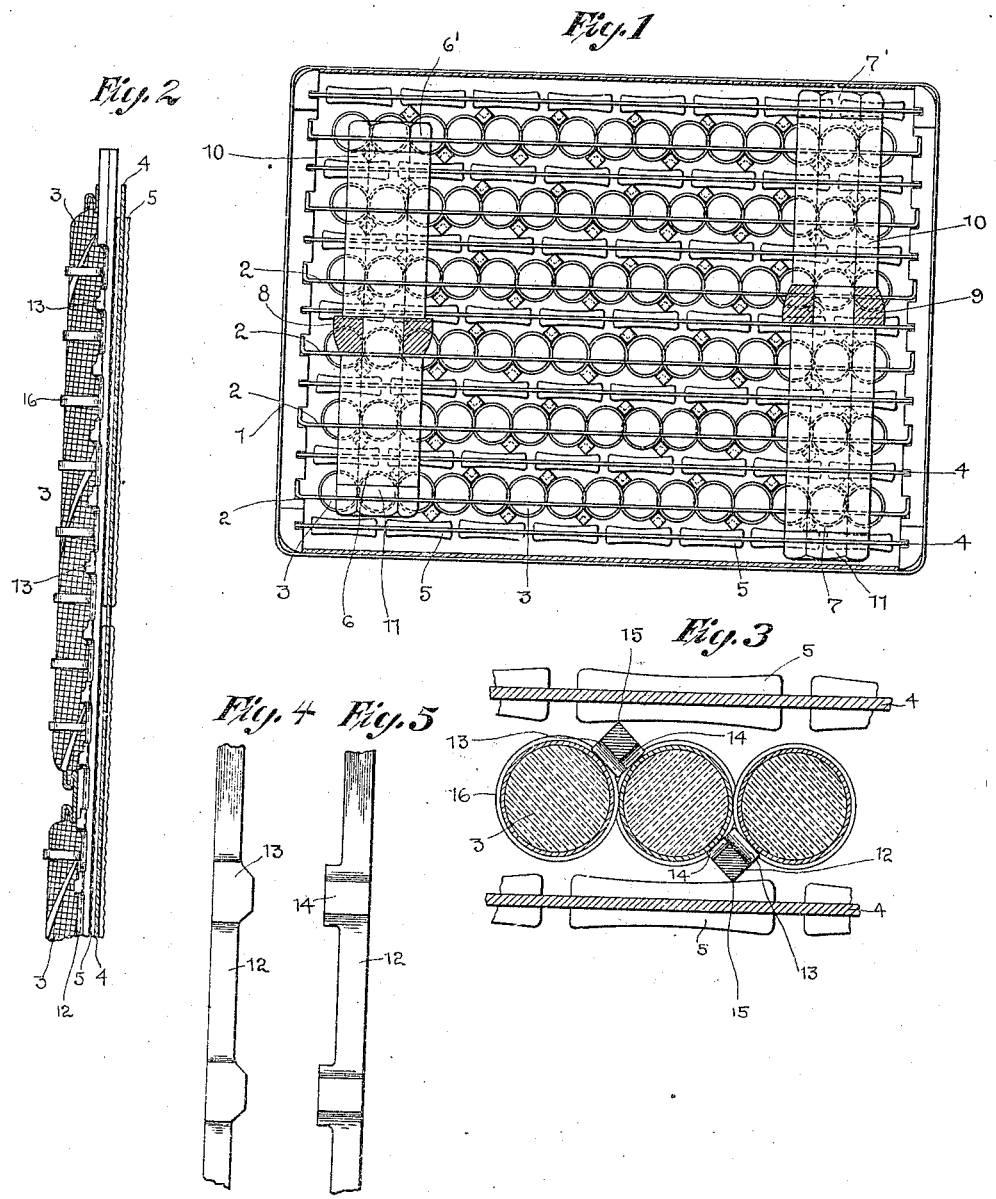

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

1,012,828.

Specification of Letters Patent. Patented Dec. 26, 1911.

Application filed May 24, 1910. Serial No. 563,042.

*To all whom it may concern:*

Be it known that I, THOMAS A. EDISON, a citizen of the United States, and a resident of Llewellyn Park, West Orange, New Jersey, have invented certain new and useful Improvements in Storage Batteries, of which the following is a description.

My invention relates to improvements in storage batteries and more particularly to the means for preventing contact between electrodes of opposite polarity.

My object is to provide an improved insulating separator, both as a new article of manufacture, and in combination with the elements of the battery.

The improved separator is designed to permit free circulation of the electrolyte and to interfere as little as possible with the effective working of the active surfaces of the electrodes. It is designed especially for use in connection with storage batteries of the type invented by me, disclosed in my prior patents, wherein insoluble active materials are employed in an alkaline electrolyte, although it will be understood that the invention is applicable for use with storage batteries of other types.

The separator consists of a strip of insulating material, rectangular in cross section, and having lugs or projections formed at intervals on two adjacent side surfaces. In the Edison storage battery as now manufactured, insulating strips are placed in position, each one between a pair of tubular pockets of each positive grid and the adjacent flat pocket of the adjacent negative grid. The projections formed upon two sides of each strip contact the adjacent surfaces of the tubular positive containers and the diagonally-opposite edge of the strip contacts the adjacent flat pocket of a negative grid. Thus, the strips have only line contact with the negative pockets and substantially point contact with the positive pockets, so that the electrolyte may freely circulate and enter substantially all of the perforations of both kinds of pockets while contact between pockets or grids of opposite polarity is effectively prevented.

In order that a clear understanding of my invention may be had, attention is hereby directed to the accompanying drawings, forming part of this specification and embodying my invention, in which—

Figure 1 represents a plan view of a storage battery can with the cover removed showing the tubular pockets separated from the flat pockets by my improved separators. Fig. 2 represents partly in side elevation and partly in section one of the separators positioned between one of the tubular pockets and the adjacent flat pocket. Fig. 3 represents an enlarged horizontal sectional detail through a number of tubular and flat pockets showing the separators in position, and Figs. 4 and 5 represent respectively partial front and side elevations of one of the separators.

Within the can or receptacle 1 are contained a plurality of grids or supporting plates 2 to which are attached the tubular pockets 3 containing the positive active material, the construction of the tubes being described in my Patent No. 880,978 granted March 3, 1908. The grids or supporting plates 4 carrying the flat concave rectangular pockets 5 inclosing the negative active material are mounted one on each side of each positive grid 2, as illustrated. The construction of the concaved flat pockets 5 is disclosed in some of my previous patents. Plates of like polarity are connected together and are mounted on bolts 6 and 7 having heads 6' and 7', which bolts pass through the eyes 8, 9 of terminals for the external circuit. The plates of each set are separated by washers 10 and the plates and washers of each set are held rigidly together on the bolts 6 and 7 by nuts 11.

In order to prevent plates or pockets of opposite polarity from touching each other, insulating separators 12 formed of hard rubber or other suitable insulating material in strips having a rectangular cross section are used. Separators 12 have lugs or projections 13 and 14 formed at intervals on two adjacent sides of the separators, as shown. The separators are placed in position between pairs of tubular pockets and adjacent rectangular pockets so that the lugs 13 of each separator rest in contact with the surface of one tubular pocket, the lugs 14 contact the surface of the adjacent tubular pocket and the edge 15 of the separator diagonally opposite contacts the surface of the adjacent flat negative pocket 5. The tubular electrodes 3 are provided with reinforcing rings 16, lugs 13, 14 of separators 12 contacting the surfaces of the tubular pockets between the rings. As there is a negative grid on each side of each positive grid, separators will be placed on each side of the positive tubular pockets. Preferably, the separators on opposite sides of the tubular pockets will be in staggered relation to each other, that is to say, separators on one side of a positive plate may contact the first and second tubular pockets and the adjacent negative pocket, the third and fourth tubular pockets and the adjacent flat negative pocket, the fifth and sixth tubular pockets and the adjacent negative pocket, etc., while on the other side of the same positive grid are placed separators contacting the second and third tubular pockets and the adjacent negative pocket, the fourth and fifth tubular pockets and the adjacent flat pocket, the sixth and seventh tubular pockets and the adjacent negative pocket, etc. With the construction illustrated, the electrolyte can circulate freely in the spaces between the tubular pockets and the separators, while the lugs 13 and 14 upon the separators have but small area in contact with the surfaces of the perforated tubular pockets and interfere but little with the electric activity of the surfaces of the electrodes. The lugs upon the separators afford substantially point contact with the positive electrodes, while the edges 15 of the separators afford line contact with the negative pockets 5.

Having now described my invention, what I claim and desire to protect by Letters Patent is as follows:

1. In a storage battery, the combination of a row of tubular electrodes of one polarity, a row of flat electrodes of opposite polarity parallel to said tubular electrodes, and non-conducting separators each arranged to contact one of said flat electrodes and two adjacent tubular electrodes to prevent contact between said flat electrodes and tubular electrodes, said separators being arranged to have substantially point contact only with said tubular electrodes, substantially as described.

2. In a storage battery, the combination of a pair of adjacent curved electrodes of one polarity, a flat electrode of opposite polarity, and a non-conducting separator arranged to have line contact with said flat electrode and substantially point contact with said curved electrodes to prevent contact between said curved electrodes and said flat electrode, substantially as described.

3. In a storage battery, the combination with two vertical grids carrying pockets containing active materials of vertical rods of insulating material situated between the grids, each rod engaging two adjacent pockets of one grid and but one pocket of the other grid, substantially as described.

4. In a storage battery, the combination with a pair of adjacent tubular pockets and a flat pocket, of a strip of insulating material of rectangular cross-section and having lugs or projections formed on two adjacent sides, mounted between said pockets to separate said tubular pockets from said flat pocket, with said lugs contacting the adjacent surfaces of said tubular pockets and the diagonally opposite edge of said strip contacting said flat pocket, substantially as described.

5. In a storage battery, the combination of a supporting plate, tubular pockets containing active materials mounted side by side carried thereby, a supporting plate carrying pockets containing active materials on each side of said first named plate, and means for preventing contact between said first named plate and tubular pockets and said other plates and pockets, comprising insulating strips mounted between pairs of said tubular pockets and adjacent other pockets on one side thereof, and insulating strips mounted between pairs of said tubular pockets and adjacent other pockets on the other side thereof, said second strips being in staggered relation to said first named strips, substantially as described.

6. As a new article of manufacture, a storage battery separator consisting of a strip of insulating material of rectangular cross section and having lugs or projections formed at intervals on two adjacent sides only, substantially as described.

This specification signed and witnesses this 19th day of May 1910.

THOS. A. EDISON.

Witnesses:
DYER SMITH,
JOHN M. CANFIELD.